United States Patent [19]

Ott et al.

[11] Patent Number: 4,829,431

[45] Date of Patent: May 9, 1989

[54] METHOD AND APPARATUS FOR CORRELATING TEST INFORMATION

[75] Inventors: Granville E. Ott; Ron H. Johns, both of Lubbock, Tex.

[73] Assignee: Texas Instruments Incorporated, Dallas, Tex.

[21] Appl. No.: 566,092

[22] Filed: Dec. 27, 1983

[51] Int. Cl.[4] .................... G09B 7/00

[52] U.S. Cl. .................... 364/419; 273/273; 434/338

[58] Field of Search .................... 434/322, 323, 327, 335, 434/338 X, 354, 362, 364; 273/237, 273 X; 364/413, 419, 709

[56] References Cited

U.S. PATENT DOCUMENTS

| | | | |
|---|---|---|---|
| 3,596,373 | 8/1971 | Morgan | 434/338 |
| 3,736,671 | 6/1973 | Oleinick | 434/338 |
| 3,964,177 | 6/1976 | Wright | 434/338 |
| 4,114,292 | 9/1978 | Smith | 434/335 |
| 4,166,325 | 9/1979 | Weber | 434/338 |
| 4,179,822 | 12/1979 | Clark | 434/335 |
| 4,337,948 | 7/1982 | Breslow | 273/237 |
| 4,339,135 | 7/1982 | Breslow | 273/237 |
| 4,345,315 | 8/1982 | Cadotte et al. | 434/322 |
| 4,372,554 | 2/1983 | Orenstein | 273/237 |
| 4,403,965 | 9/1983 | Hawkins | 434/327 |
| 4,474,557 | 10/1984 | Clossey | 434/335 |
| 4,521,199 | 6/1985 | Harte | 434/339 |

*Primary Examiner*—Allen MacDonald
*Attorney, Agent, or Firm*—William E. Hiller; N. Rhys Merrett; Melvin Sharp

[57] ABSTRACT

A method and apparatus for storing a relationship between individual elements of two or more knowledge sets includes a main computer (12) that is operable to receive a portable memory cartridge (20). The computer (12) has an input keypad (16), a storage medium (18) and a display (14). A coordinate transducer (24) is provided to input the coordinates from a test sheet (26). The test sheet (26) has a pattern of knowledge elements in a question and answer format. The relationship between the questions and answers is predetermined and is stored in the portable memory cartridge (20). The coordinate transducer (24) provides for input of the coordinates of the question and answer on the test sheet for storage in the computer. After storage, selection of the coordinates of a particular question is followed by selection of the coordinates of an answer and comparison made by the computer (12) with the stored relationship in the portable cartridge (20). A true comparison results in a correct answer and a false comparison results in an incorrect answer.

28 Claims, 4 Drawing Sheets

METHOD AND APPARATUS FOR CORRELATING TEST INFORMATION

TECHNICAL FIELD

The present invention pertains in general to a method and apparatus for correlating test information and, more particularly, to the utilization of personal computers in administering tests and evaluating test data.

BACKGROUND OF THE INVENTION

Present methods for testing students or gameplayers and evaluating the test results include the use of standardized answer sheets that are marked with a lead pencil, thus enabling the answer sheet to be read by a computer. To utilize these types of tests, it is necessary to develop a separate question sheet which correlates with the answer sheet. The particular answers for the test, which can be multiple choice answers, are encoded by the teacher and later associated in the computer with the filled out answer sheet to determine whether the answer is correct or incorrect. This association is normally done in conjunction with a code that is placed on the answer sheet at some location to indicate the particular sequence of correct answers which should be provided.

Such testing methods do not generally provide for grading by an association between the test question and the test answer at the testing site itself. Rather, it is often necessary to reassociate the answer sheet and the answers thereon with the proper sequence at another location which evaluates the test answers. The question sheets are excluded from association with the answer sheets, thus creating the possibility of errors. Moreover, the use of such standardized tests requires the student to read the question, associate the proper number of the question with the proper number for the answer choices on the answer sheet, and then select the proper answer. It is not uncommon for the student to become confused and insert the answer in the wrong place.

Testing techniques have thus been developed wherein test questions and correct answers are entered into a computer. The questions are displayed to a student, who chooses the answer by operation of the computer keyboard. The computer then determines if the correct answer has been chosen and displays feedback information to the student or game-player. However, such techniques normally require a substantial amount of data to be input into the computer, thus requiring data entry time as well as substantial storage capacity. Further, many low cost displays used with personal computers are not able to provide sufficient visual detail for many types of lessons.

In view of the above disadvantages with presently available testing methods, there exists a need for a testing method that improves test taking accuracy by allowing a higher degree of association between the questions and answers, and which alleviates the need to associate a test question with the proper answer location on a test sheet before inserting the proper answer. Such a method should not require substantial entry of data into a computer, and should allow for immediate feedback of information to the test taker. Such a technique should also eliminate the requirement of displaying detailed images on the computer display.

SUMMARY OF THE INVENTION

The present invention disclosed and claimed herein comprises a method and apparatus for associating various knowledge elements in various knowledge sets. The apparatus includes a plurality of knowledge sets having individual knowledge elements therein, select ones of the knowledge elements in one of the sets related to one of the knowledge elements in another of the knowledge sets. A correlation pattern is generated that defines the relationship between all of the knowledge elements and this correlation pattern is stored in a storage medium. Individual ones of the knowledge elements from the knowledge sets are selected and then compared to determine the correlation therebetween according to the correlation pattern in the storage medium.

In another embodiment of the present invention, the correlation or non-correlation of the knowledge elements is immediately indicated. Alternatively, the correlation or non-correlation of the knowledge elements can be stored for retrieval at a later time. The storage medium for storing the correlation pattern is a portable non-volatile storage medium to facilitate use at a plurality of remote points.

In yet another embodiment of the present invention, first and second predetermined patterns are impressed upon a printed sheet at specific locations thereon to represent a question knowledge set and an answer set, respectively. Use of the printed sheet eliminates the requirement of detailed computer displays and reduces data input into the computer. To input the patterns into memory, the locations are converted into coordinates and the coordinates are stored in the memory. To select individual ones of the knowledge elements, it is only necessary to select the coordinates thereof. These coordinates are then associated with the particular point in the pattern which the knowledge element occupies.

In a further embodiment of the present invention, a method is provided that includes the steps of generating a plurality of knowledge sets having individual knowledge elements therein. A correlation pattern is generated to define a relationship between all of the knowledge elements in the various sets and this relationship is stored in a portable memory element. At a remote location, individual ones of the knowledge elements are selected from each of the knowledge sets. The selected knowledge elements are then associated and compared with the correlation pattern stored in the portable storage medium.

BRIEF DESCRIPTION OF THE DRAWINGS

For a more complete understanding of the present invention and the advantages thereof, reference is now made to the following description taken in conjunction with the accompanying Drawings in which.

FIGS. *6a* and *6b* illustrate a flow chart for selecting the various elements and correlating them with prestored correlated data.

DETAILED DESCRIPTION OF THE INVENTION

Figure 1:
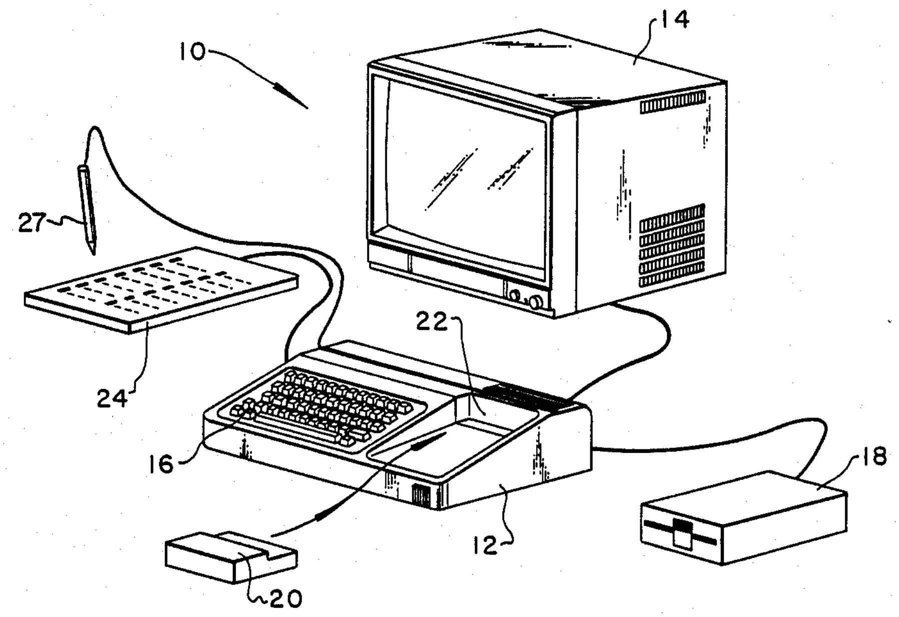
FIG. 1 illustrates a perspective view of a system for practicing the present invention.

Referring now to FIG. 1, there is illustrated a perspective view of a computer system 10 that is utilized in conjunction with the present invention. The computer system 10 includes a main digital computer 12 with a display 14 attached thereto. The main computer 12 has a keyboard 16 for input of data thereto and an external data input device 18. In addition, a portable memory element 20, such as a conventional memory cartridge, is provided for insertion into a cartridge port 22 on the main computer 12. The main computer 12 can be of the type manufactured by Texas Instruments, Inc. under Model No. TI99/4A or any similar type device. The display 14 may be any type that is compatible with the main computer 12 and the data input device 18 may be a disk drive or a cassette player for inputting data from cassettes.

A coordinate transducer 24 is provided for interfacing to the main computer 12. The coordinate transducer 24 is operable to receive a test paper which has questions and answers printed thereon at discrete locations. The test paper can include detailed graphics not possible to be properly displayed on low cost personal computer displays. Rather than optically read the text of the questions and answers into the memory of the main computer 12 or input them through the keypad 16, the transducer 24 allows the taker of the test to input coordinates of the questions and answers into the memory of the main computer 12. As will be described hereinbelow, the coordinates of the questions and answers provide the computer with the ability to distinguish between individual ones of the questions and individual ones of the answers. Therefore, once the coordinates are stored in the computer, an operator may select the coordinates of any given question and then select the coordinates of the answer. The correct sequence of questions and answers are provided by the memory element 20, and thus the computer is then able to quickly grade the test.

For example, if five questions numbered 1 through 5 are disposed on the test paper and five answers numbered 1 through 5 are also disposed on the test paper, it is only necessary to input to the computer the coordinates of a selected question with the coordinates of a selected answer. If the correct answer to question number 3 is answer number 2, for example, then the only information the computer needs is the coordinates of the selected question and answer and which one of the answers is correctly associated with the selected question. It is not important for the computer 12 to have access to the actual information that is contained in the question or in the answer, thus eliminating the requirement of substantial data input. The correct relationship between the questions and answers is a predetermined relationship that is stored in the memory element 20.

The coordinate transducer 24 may include a layer of conductive film that is disposed over a piece of glass. The test paper is then placed under the piece of glass such that an individual can view the questions and answers disposed on the surface of the test paper. One side of the conductive film is connected to an electrode (not shown) to constitute the X axis and an adjacent side of the film is connected to another electrode (not shown) to constitute the Y axis. The conductive film has a finite resistivity such that any point on the surface of the conductive film has a finite resistance to both the X-axis electrode and the Y-axis electrode. For example, a first arbitrary point on the surface of the conductive film has an X-axis resistance between the arbitrary point and the X-axis electrode and a Y-axis resistance between the arbitrary point and the Y-axis electrode. The X-axis resistance and Y-axis resistance are a function of the relative position of the arbitrary point on the surface of the conductive film with respect to both the X and Y-axis electrodes.

A stylus 27 is provided that is connected to a voltage supply which, for simplicity purposes, is illustrated as being internal to the main computer 12. The stylus 27 is operable to be positioned on a point on the surface of the conductive film to impress a voltage on the surface of the conductive film. Both the X and Y-axis electrodes are connected to a common reference such as ground through individual resistors such that the voltage of the stylus 27 causes a current to flow through the conductive film to the X and Y axis electrodes and through the resistors to ground. The voltage at the X and Y-axis electrodes is a function of the voltage on the stylus 27 and the distance of the stylus 27 from the respective one of the X and Y-axis electrodes. By moving the stylus 27 about the surface of the conductive film, the voltages on the X and Y-axis electrodes vary. These voltages are digitized and applied to the computer 12 as coordinate data. Therefore, the relative position of the stylus 27 with respect to the surface of the test sheet in the coordinate transducer 24 can be determined and thus the coordinates of the point at which the stylus 27 is positioned on the conductive film. It should be understood that various types of devices which allow the computer to determine the coordinates of a discrete location on any type of planar surface will be suitable.

Figure 2:
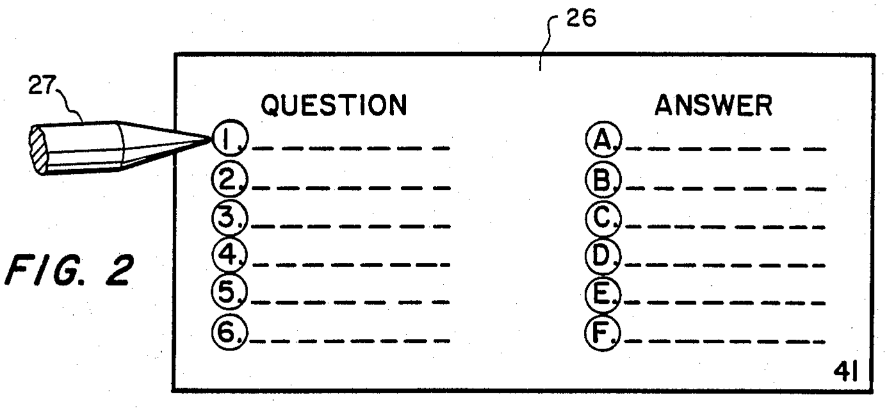
FIG. 2 illustrates a planar view of a test element in accordance with the invention.

In order to better understand the operation of the present invention, reference is made to FIG. 2 which illustrates a planar view of a test sheet 26 that includes one type of question and answer pattern disposed on the surface thereof. This test sheet 26 is prepared by a "teacher" and the test is taken by a "student". It will of course be understood that the "student" could be a game-player or other type of computer user. To prepare the test sheet 26, the teacher first develops a series of questions and a corresponding list of correct answers. To insure that the teacher does not develop a predictable sequence of answers for different tests, a random code generator program is next used to scramble the answers. The particular random code output associated with test sheet 26 is designed by the input code "41", which is labeled on the lower right hand corner of the test sheet 26. The questions are entered sequentially on test sheet 26 in the same order as provided by the teacher, but the answers are entered in the random order provided by the random code output which corresponds to the input code "41". Each different test would utilize a different random sequence for the answers.

For example, as illustrated in FIG. 2, the questions are numbered 1 through 6 and the answers are numbered A through F. Question 1 has the correct answer C associated therewith, question 2 has answer E associated therewith, question 3 has answer A associated therewith, etc. When the teacher originally wrote the questions and answers, question 1 was associated with answer A, question 2 was associated with answer B, question 3 was associated with answer C, etc. By entering the input code to the random code generator program, the sequence C, E, A, etc., was generated. Thus, when the test sheet 26 was prepared, the answers were scrambled in accordance with the random code output. Thereafter, the selection by the student of the number for the question and the letter for the answer enables the computer to make a determination as to whether the correct answer was selected for association with the selected question.

The pattern of six sequential questions and six sequential answers and the correct relationship therebetween is stored in the cartridge 20 utilizing conventional means. Coordinate data is not required to be stored in the cartridge. This cartridge and the test sheet 26 can then be given to a student for insertion of the cartridge 20 into the digital computer 12 and the test sheet 26 into the coordinate transducer 24 when it is desired to take a test. A program that allows utilization of the cartridge 20 and the associated test sheet 26 may be input to the computer 12 through the keypad 16 or through the data input device 18.

In order to allow the student to select the particular questions and answers from the test sheet 26 directly, the coordinate transducer 24 is employed. However, the student must first "orient" the test paper for the computer 12; that is, the coordinates of each of the questions and each of the answers must be "taught" to the computer. This is done by associating a specific location on the test sheet 26 with each of the questions and answers.

While one technique for orientation is to register the test sheet in a predetermined location on the transducer 24 and input stored coordinate data from the memory cassette 20, this technique requires precise registering and a precise, linear and stable transducer.

Therefore, the preferred embodiment allows the student to "teach" the coordinates to the computer before taking the test. With respect to the particular pattern illustrated in FIG. 2, this is accomplished by predisposing a circle around each of the numbers for the questions and each of the letters for the answers, thereby defining a "location" for each question and each answer. The stylus 27 is then sequentially placed by the student on each of the numbers for the questions and then sequentially placed on each of the answers A through E. This is done with some prompting from the computer, such that the computer can recognize when the stylus 27 is placed on the particular location. For example, the computer may command, "place the stylus on questions 1 through 6 in sequence", etc. The computer then stores in internal memory a sequence of coordinates for the questions and a sequence of coordinates for the answers. Thereafter, the computer can identify each question or answer touched by stylus 27. As described above, the correct relationship between the questions and answers is stored in the memory cartridge 20. However, this relationship is not available to the student.

After the student stores the coordinates for the questions and answers in the computer 12, the computer prompts the student to enter through the computer keyboard the code at the bottom right hand corner of the test sheet 26, which in the specific example is "41". This information code tells the computer 12 the correct sequence of answers. The information code may be used to pull the correct sequence of answers from the cartridge 20, or alternatively could run a random code generation program within computer 12 to generate the correct sequence of answers. The computer 12 is now ready to accept the answers from the student and to grade the correctness of the answers.

To take the test, the student selects a particular question number 1 through 6 by touching the selected number location with the stylus 27 and then selects one of the answers by touching the respective letter location with the stylus 27. The computer 12 then associates the coordinates selected with the stored coordinates to determine which one of the questions and/or answers has been selected. It should be noted that the computer only recognizes a question by its appearance in a "string" of coordinates, which are those stored by the student initially.

The particular questions and answers that are associated by the student are then compared to the relationships between questions and answers stored in the computer 12 to determine if the proper association has been selected and thus the right answers chosen. After this comparison is made, an audible and/or visual indication can be provided to indicate to the student whether the answer was correct or incorrect. Alternately, the correct or incorrect answer can be stored in the cartridge 20 and reselection of that particular question or answer inhibited. At a later time the teacher can place the cartridge 20 in a different computer 12 to evaluate the results of the test.

Figure 3:
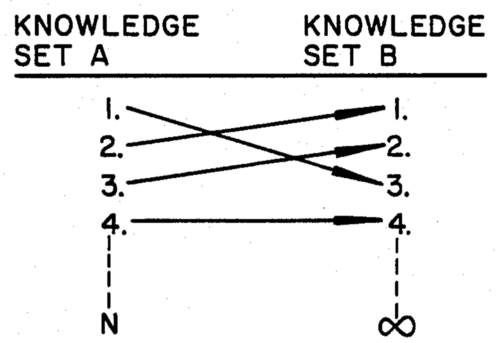
FIG. 3 illustrates a schematic representation of two knowledge sets with the relationships therebetween.

FIG. 3 illustrates two sets of information which are defined as Knowledge Set A and Knowledge Set B. Knowledge Set A corresponds to the questions in FIG. 2 and Knowledge Set B corresponds to the answers in FIGURE 2. Alternatively, Knowledge Set A may comprise a series of words which are to be matched with words in Knowledge Set B, such as states a capitals for instance. The questions and answers will hereinafter be referred to as question and answer elements, respectively, or generally as knowledge elements. Knowledge Set A can have from 1 to N question elements and Knowledge Set B can have answer elements ranging from 1 to infinity. Each of the question elements in Knowledge Set A is related to one of the answer elements in Knowledge Set B. Since there are more elements in Knowlege Set B than in Knowledge Set A, some of the elements in Knowledge Set B will not be related to elements in Knowledge Set A.

When the teacher originally developed the relationship between Knowledge Sets A and B, element 1 in Set A was related to element 1 in Set B, element 2 in Set A to element 2 in Set B, element 3 in Set A to element 3 in Set B and element 4 in Set A to element 4 in Set B. The predetermined relationship between the various knowledge elements in the two knowledge sets can be stored by conventional techniques in a programmable memory element such as an Erasable Programmable Read Only Memory (EPROM) or a Random Access Memory (RAM) with a dedicated power source that are disposed in the cartridge 20.

As noted, the spatial relationships between the questions and answers should be varied to increase the complexity of the test. Therefore, it is desirable to have differing patterns and relationships for each test given. To generate different relationships, the random function generator program is utilized to assemble the correct answer elements in a given sequence to define the relationship thereof with the question elements. Use of the random function generator results in a variation which is illustrated in FIG. 3 by the solid lines wherein element 1 of set A is now related to element 3 of set B, element 2 of set A is now related to element 1 of set B, element 3 of set A is now related to element 2 of set B and element 4 of set a is now related to element 4 of set B.

Figure 4:
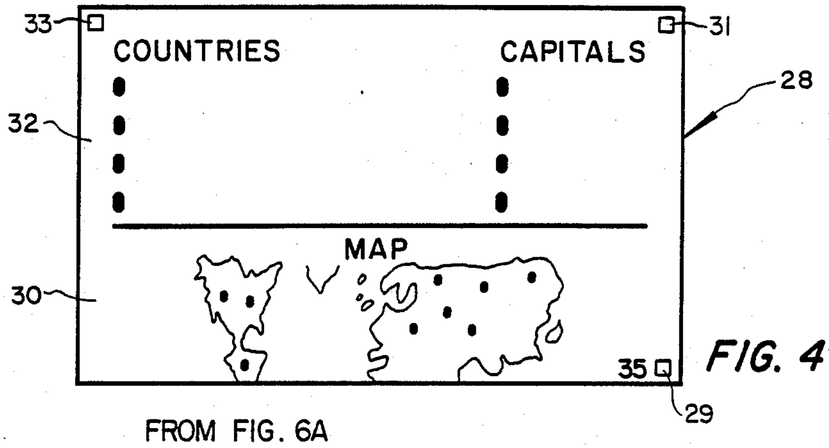
FIG. 4 illustrates a planar view of an alternate test sheet.

Referring now to FIG. 4, there is illustrated a test sheet 28 which utilizes graphics as well as questions and answers. The test sheet 28 utilizes a pictorial representation of specific locations and a list of related knowledge elements. The pictorial representation is disposed on a portion 30 of the sheet 28 and related knowledge elements are disposed on portion 32 on the test sheet 28. The elements of the pictorial portion 30 are, for example, locations on a map and the elements of the portion 28 may be printed answers such as capitals or cities. The student may be required to touch the stylus 27 to each printed country and then touch a printed capital and the location of the capital on the map. The student is also prompted to enter in the random code number "35" into the computer via the keyboard, in order to store the correct question and answer sequence from cartridge 20 into computer 12.

As noted, there are several possible techniques for registering the coordinates of the question elements and the related answer elements. In one method, the coordinates of all of the question and answer elements are stored in the cartridge 20. This step is performed by the teacher. The computer need only compare various coordinates selected by the student with the stored coordinates. However, this method requires accurate registration techniques to insure that the test sheet 28 is always correctly oriented. To provide reference coordinates when utilizing this technique, registration or indexing marks 29, 31, and 33 are placed on the test sheet 28 to allow proper indexing.

With such reference coordinates, the question and answer element pattern can be defined in terms of the individual elements coordinates and these element coordinates stored in the memory cartridge 20. The student need not "teach" the computer 12 the individual coordinates of the question and answer elements but, rather, only input the reference coordinates through use of the registration marks 29, 31 and 33. For example, the coordinates of question element 3 and the associated answer element are stored in the cartridge 20 and the student is only required to input the registration marks 29, 31 and 33 with the stylus 27 and then select the coordinates of the question element 3 followed by selection of any answer element to the answer portion 32. The computer 12 then recognizes the coordinates and compares this selection with the correct question-answer relationship stored in the cartridge 20.

Referring further to FIG. 4, the preferred method is to allow the student to input the pattern and relationship between the element locations in the portion 30 and the portion 32. As previously described, the student sequentially touches the stylus 27 to each designated portion of the test sheet 28 to generate coordinates. This technique allows the use of a relatively inexpensive tranducer.

Figure 5:
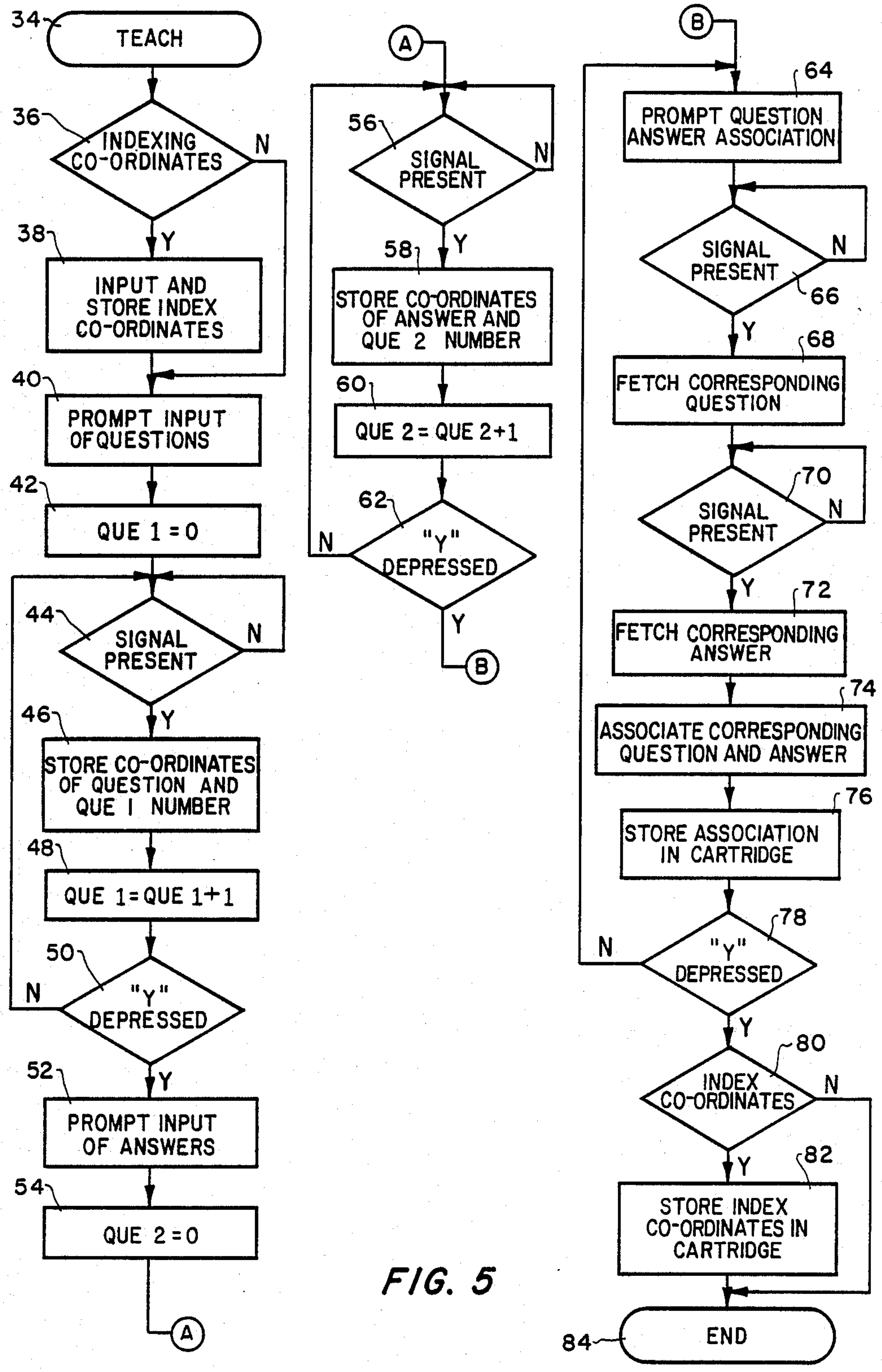
FIG. 5 illustrates a flow chart for the teaching procedure.

Referring now to FIG. 5, there is illustrated a flow chart of the function of inputting the initial pattern and/or coordinates of the knowledge elements into the memory cartridge 20 by the teacher. As described above, the memory cartridge 20 stores the relationship between the knowledge elements and the pattern. In addition, the associated coordinates can be stored therein. The program is initiated at a start block 34 labeled TEACH. After initiation, the flow chart proceeds to a decision block 36 to decide whether an indexing coordinate is present. As described above, the indexing coordinate allows the indexing of a reference coordinate that can be repeated at the student's station. If there are indexing coordinates, the program proceeds along the Y path to a function block 38 to store the index coordinates. The program then flows to a function block 40 to provide a prompt to the teacher to begin inputting the locations of the particular questions on the test sheet. If no indexing coordinates are to be stored, the program processing the N path of the decision block 36 to the input of the function block 40.

The prompt supplied by the function block 40 can be an audio prompt or a prompt displayed on the display 14. After supplying the prompt, the program proceeds to a function block 42 wherein a QUE1 register is set equal to zero. The QUE1 register is a software counter that provides an indication of which question or knowledge element is being input. After setting QUE1 equal to zero, the program proceeds to a decision block 44 to decide whether a signal is present. If no signal is present, the program proceeds along the N path thereof back to the input. In this manner, the program will operate in a continual loop until a signal is sensed which indicates that coordinates are being received. When the stylus 27 is placed against the coordinate transducer 24 to activate it, a signal triggers the program to flow along the Y path of the decision block 44 to a function block 46 wherein the coordinates of the particular question and the associated QUE 1 number is stored in internal memory. After storage, the program proceeds to a function block 48 wherein QUE1 is incremented. After incrementation, the program proceeds to a decision block 50 which decides whether the input key "Y" on the keypad 16 is depressed. The depression of this key is a signal from the operator that no more knowledge elements in the question knowledge set are to be input for storage in internal memory. If, however, there are additional questions, the program proceeds along the N path of the decision block 50 back to the input of the decision block 44 to await another coordinate.

If the "Y" key is depressed, the program proceeds along the Y path of the decision block 50 to a function block 52 to supply a prompt to the teacher that the system is ready for the input of elements from the answer knowledge set. After the prompt has been supplied, the program proceeds to a function block 54 where a second software register QUE2 is set equal to zero. The QUE2 register is identical to the QUE1 register except that it is associated with the answers.

After QUE2 is set equal to zero, the program proceeds to a decision block 56 to sense the presence of a signal. If no signal is present, the program returns to the input of the decision block 56 and, if a signal is present, the program proceeds along the Y path thereof to a function block 58 to store the coordinates of the answer and the QUE2 number therewith in internal memory. After storage, the program proceeds to a function block 60 to increment QUE2. After incrementation, the program flows to a decision block 62 to determine if the "Y" key is depressed in a manner similar to the decision block 50. If not depressed, the program proceeds along the N path back to the input of the decision block 56 to wait for another set of answer coordinates and if the "Y" key is depressed, the program proceeds along the Y path to a function block 64.

The function block 64 supplies a prompt to begin the question and answer association. The teacher must now associate a particular element in the question knowledge set with a particular element in the answer knowledge set. After prompting, the program proceeds to a decision block 66 to decide whether a signal is present. If no signal is present, the program proceeds back to the input thereof along the N path and, if the signal is present, the program proceeds along the Y path to a function block 68 to fetch the corresponding question out of internal memory. As was described above, the coordinates indicate which question was selected.

After fetching the corresponding question, the program proceeds to a decision block 70 which decides if another signal is present. The program proceeds along the N path thereof until a signal is present at which time it proceeds along the Y path thereof to a function block 72 to fetch the corresponding answer out of memory. An answer will always follow a question, since this is the association that is desired.

After fetching the corresponding answer, the program proceeds to a function block 74 to associate the corresponding question and answer and then to a function block 76 to store the association in the memory cartridge 20. The program then proceeds to a decision block 78 to decide whether the "Y" key is depressed. If not depressed, the program proceeds along the N path thereof back to the input of the function block 64. If depressed, the program proceeds along the Y path of the decision block 78 to the input of the decision block 80. The decision block 80 decides whether index coordinates were input. If index coordinates were input, the program proceeds along the Y path to a function block 82 to store the index coordinates in the memory cartridge 20 and then proceeds to an END block 84. If there are no index coordinates, the program proceeds along the N path to the END block 84.

In the flow chart of FIG. 5, the association stored in the function block 76 is both a function of the relation of the answers and questions and also of the coodinates. If the teacher desires to only place the pattern into the memory cartridge 20, it is not necessary to go through a selection of coordinates. In that situation, it is only necessary to input the pattern for the question knowledge set and the pattern of the answer knowledge set into the memory cartridge 20 in addition to the particular relationship of the elements in the two knowledge sets. This relation defines the particular answer that is associated with a given question. As was described above, there may be more answers than there are questions and there may be two answers for a particular question or one answer for two different questions.

In order for the teacher to prevent a given pattern from being deciphered by a particular student, it may be desired to randomize the relationship pattern between the two knowledge sets. To achieve this, any suitable conventional random number generator subroutine is used. This random number generator is utilized to "scramble" the relationships between the question and answer elements. In so doing, the teacher will be the only one that has the particular relationship and this relationship can be altered at the teacher's discretion before generating another test sheet.

Figure 6B:
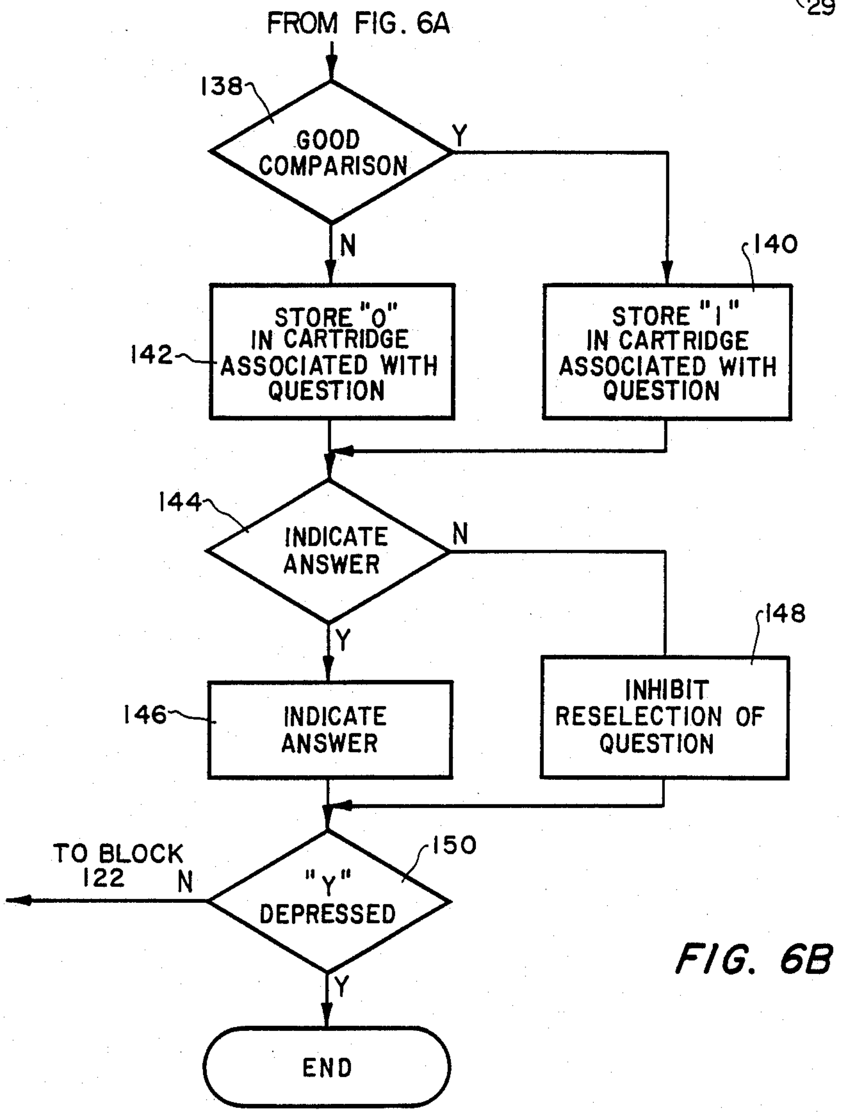
Figure 6A:
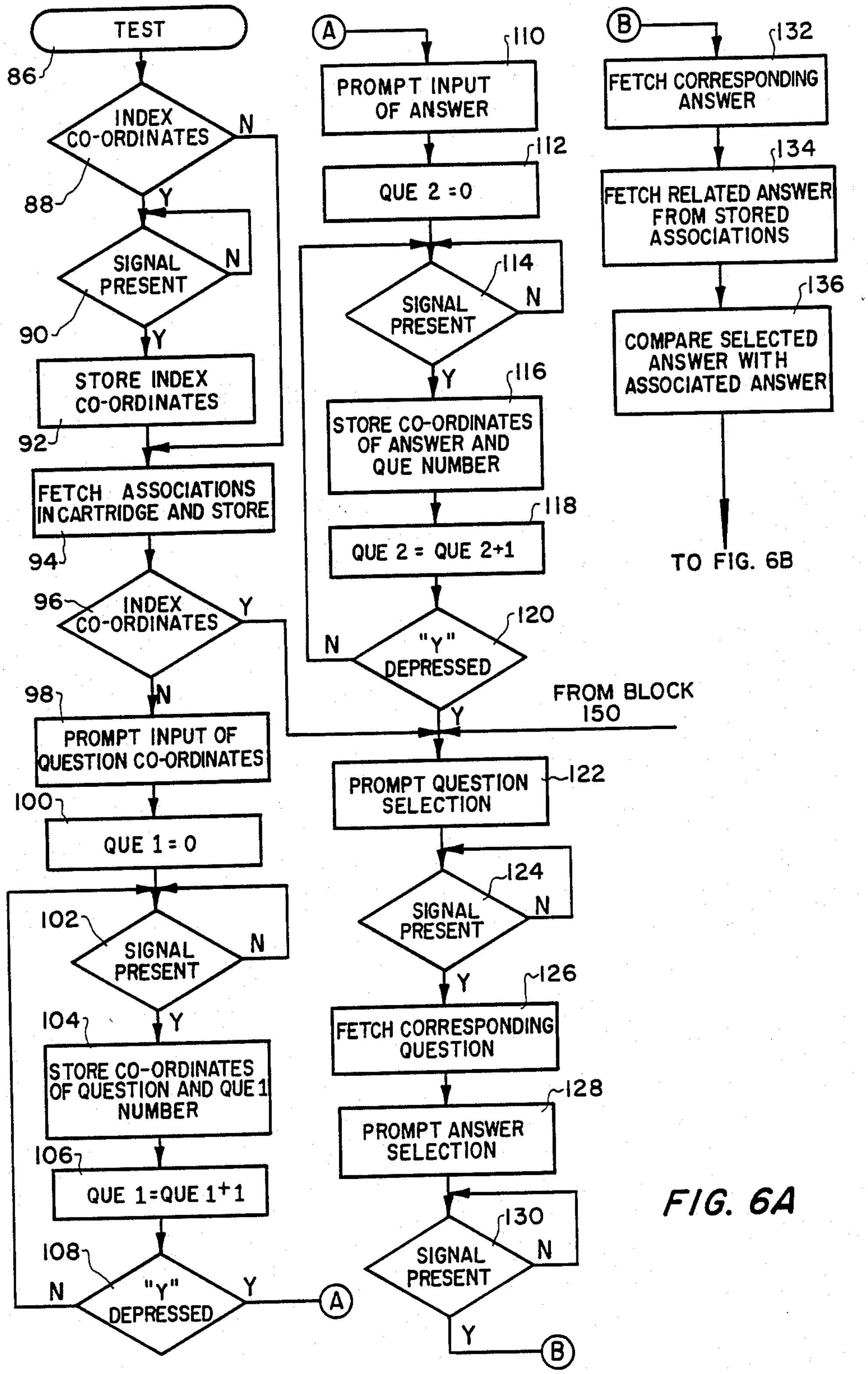

Referring now to FIGS. 6A and 6B, there is illustrated a flow chart for the testing portion of the system. As was described above, the memory cartridge 20 is utilized to store the pattern of the particular knowledge elements and the relationship between elements of various sets. As described above, this memory cartridge is essentially a non-volatile read/write memory that can be input to the main computer 12 by the teacher for the input of the pattern and relationship and then transported to a remote location to allow a student to place it in a similar computer for use thereof. To prevent tampering with the particular relationship, passwords and various security devices can be utilized to deny access to the particular address having the relationship thereon.

In order to utilize this data, it is necessary that the student input a predetermined program which can be supplied on any storage medium such as disk or a cassette for input on the storage device 18. This program will manipulate the data and may utilize a standard language such as Basic which is readily available to most digital computers.

The flow chart in FIG. 6A is initiated in an initiation block 86 labeled test. The flow chart then flow to a decision block 88 to decide whether the test sheet utilized has index coordinates. If index coordinates are utilized, the program proceeds along the Y path to decide if there is a signal present. Until a signal is present, the program flows around the N path back to the input of the decision block 90. When the coordinate is selected to present a signal, the program proceeds along the Y path to a function block 92 to store the index coordinates in internal memory and then to the input of a function block 94. If no index coordinates are to be utilized on the test sheet, the program proceeds along the N path of the decision block 88 to the input of the function block 94.

The function block 94 is operable to fetch the particular association that are stored in the cartridge 20 and then store them in the internal memory of the main computer 12. After storage of these associations, the program proceeds to a decision block 96 to decide whether index coordinates were input for a test sheet requiring reference coordinates. If no index coordinates were input, the program proceeds along the N path thereof to a function block 98 to provide a prompt that the program is ready to receive input of the coordinates for the elements of the question and knowledge set. The program then proceeds to a function block 100 to set a QUE1 equal to zero. QUE1 is a software register similar to QUE1 of the flow chart of FIG. 5. After zeroing this register, the program proceeds to a decision block 102 to decide whether a signal is present. If a signal is not present, the program returns to the input of the decision block 102 along an N path and, if the signal is present, along the Y path thereof to a function block 104 to store both the coordinates of the question and the QUE1 number. After storage, the program proceeds to a function block 106 to increment QUE1. After incrementation, the program proceeds to a decision block 108 to determine if the "Y" key has been depressed. If not depressed, the program proceeds back to the input of the decision block 102 along an N path and, if depressed, proceeds along a Y path to the input of a function block 110.

The function block 110 is operable to provide a prompt to indicate to the student that all of the coordinates for the questions have been input and the computer is now ready to receive the coordinates of the answers. The program then proceeds to a function block 112 where a software register QUE2 is set equal to zero. QUE2 is similar to QUE2 of the flow chart of FIG. 5. After zeroing, the program proceeds to the input of a decision block 114 to decide if a signal is present to indicate the selection of coordinates. If no signal is present, the program proceeds to the input thereof along an N path and, if the signal is present, proceeds along the Y path thereof to a function block 116 to store the coordinates of the answer and the QUE number. After storage, the program proceeds to a function block 118 to increment QUE2 and then to input of a decision block 120. The decision block 120 decides whether the "Y" key has been depressed. If not depressed, the program proceeds back to the input of the decision block 114 along an N path, and, if depressed, proceeds along a Y path to the input of a function block 122.

The function block 122 provides a prompt for the student to select a question and begin the test. After prompting, the program proceeds to a decision block 124 to decide whether a signal is present to indicate the selection of a particular question. Until a selection is made, the program proceeds back to the input of the decision block 124 along an N path. Upon selection, the program proceeds along a Y path to the input of a function block 126 to fetch the QUE1 number of the selected question indicated by the coordinates from internal memory. As described above, each of the questions is stored by coordinates and the QUE1 number input in the teaching program of FIG. 5.

After fetching the QUE1 number from internal memory, the program proceeds to a function block 128 to provide a prompt to the user that an answer must now be selected. After prompting, the program proceeds to a decision block 130 to decide whether a signal is present to indicate selection by the student with stylus 20 of an element in the answer knowledge set. Until a selection is made, the program proceeds back to the input of the decision block 130 along the N path and, upon selection, proceeds along a Y path to a function block 132.

The function block 132 indicates a step whereby the QUE2 number corresponding to the coordinates of the answer element is selected. The program then proceeds to a function block 134 to fetch the related answer from the stored associations that were obtained from the cartridge 20. After fetching the related answer, the program proceeds to a function block 136 to compare the related answer that was stored in the memory cartridge 20 with the selected answer to determine if the two answers occupy a corresponding element location in the particular patterns.

After comparison, the program proceeds to a decision block 138 (FIG. 6A) to decide whether there was a good comparison. If a good comparison was made, the program proceeds along a Y path to a function block 140 wherein a "1" answer indicator is stored in the memory cartridge 20 and associated with the appropriate location of the related question element in the question knowledge set. If the comparison was false, the program proceeds along an N path to a function block 142 wherein a "0" answer indicator is stored in the memory cartridge 20 associated with the related question element in the question knowledge set. After storage of either a "0" or a "1" in the memory cartridge 20, the program proceeds to the input of a decision block 144 to decide whether an answer is to be indicated to the student. If the answer is to be indicated, the program proceeds along a Y path to a function block 146 to indicate the answer. This can be accomplished by displaying the phrase on the display 14 or through audio feedback. If no answer is to be indicated, the program proceeds along an N path from the decision block 144 to a function block 148 wherein reselection of the particular question element is inhibited. This insures that the student only has one attempt at associating an element from the answer knowledge set with any given element in the question knowledge set.

After indicating the answer or inhibiting reselection, the program proceeds to the input of a decision block 150 to decide whether the "Y" key is depressed. If depressed, the program proceeds along a Y path to a termination block labeled END and, if the "Y" key is not depressed, the program proceeds along an N path to the input of function block 122 to prompt another question selection. After all questions have been selected or when the student has given up, the "Y" can be depressed to end the program.

If index coordinates have been input and the program proceeds through the decision block 90 and the function block 92 in the program of FIG. 6, the program will proceed from the decision block 96 along the Y path thereof to the input the function block 122 to begin question and answer selection. When index coordinates are input, this indicates that the memory cartridge 20 has coordinates stored therein in association with the particular elements of the various knowledge sets and input of new coordinates are not necessary.

After taking the test, the student returns the memory cartridge 20 to the teacher with the test results stored therein. The teacher can then "grade" the scores merely by retrieving the particular question element with the associated answer indicator stored therein, as indicated by function blocks 140 and 142. Thus, it is only necessary for the teacher to recover the total number of question elements and the related indicators to generate a score.

In summary, there has been provided a system that can store a plurality of question and answer knowledge elements arranged in the form of knowledge sets. Relationships between elements in the various sets can be stored in a portable memory and this relationship associated or correlated with coordinates on a test sheet or external medium. By inputting the two dimensional coordinates of the question and answer elements disposed on this external medium into a separate computer that interfaces with the memory cartridge, the relationship of the elements can be reconstructed by a student. By inhibiting the recovery of the particular relationship between the question and answer elements, a practical testing apparatus is provided wherein the student must associate the question elements with the related answer elements with no knowledge of the actual or predetermined relationship.

Although the preferred embodiment has been described in detail, it should be understood that various changes, substitutions and alterations can be made therein without departing from the spirit and scope of the invention as defiend by the appended claims.

What is claimed is:

1. An educational system for use by a student comprising:

a test element having a first set of knowledge elements arranged in a first predetermined pattern, and a second set of knowledge elements arranged in a second predetermined pattern, each of said second knowledge elements related to one of said first knowledge elements;

a portable non-volatile memory having stored therein the correct relationship of the elements in said first and second patterns;

a digital computer for interfacing with said portable memory, said computer having on-board memory integral therewith;

means operable by the student for storing said first and second predetermined patterns in said on-board memory of said computer; and means operable by the student for selecting one of the knowledge elements in said first predetermined pattern and one of the knowledge elements in said second predetermined pattern from said test element and generating signals to said computer representative of said selections;

said computer operable for comparing the relationship of the two selected knowledge elements with the stored relationship in said portable memory to determine if the two selected knowledge elements are related.

2. The system of claim 1 wherein said test element comprises a planar surface responsive to said means for selecting and having the elements in said first and second knowledge sets disposed at predetermined locations on the surface thereof.

3. The system of claim 1 wherein the elements of said first knowledge set are questions and the elements of said second knowledge set are answers to the questions in said first knowledge set.

4. The system of claim 1 and further comprising means for storing the results of the comparison in said portable memory such that the correct or incorrect relationship of the selected elements from said first and second knowledge sets can be determined at a later time.

5. The system of claim 1 and further comprising means for indicating the results of the comparison to provide an immediate indication as to whether the relationship between the selected elements in said first and second knowledge sets is identical to the relationship stored in said portable memory.

6. An educational system for use with a computer having internal memory, comprising:

a plurality of test elements each having a plurality of first knowledge elements disposed in a first pattern and a plurality of second knowledge elements disposed in a second pattern, said first and second elements having a predetermined relationship therebetween;

a portable non-volatile memory cartridge for coupling with the computer and having the predetermined relationships of said first and second elements of said test element stored therein;

means operable by the user for designating which test element is being used and for inputting said first and second patterns into the internal memory of the computer from said test element; and transducer means associated with the test element being used for operation by the user for selecting one of said first elements and one of said second elements from selected locations in said first and second patterns for input to and storage in the internal memory of the computer;

said computer retrieving the predetermined relationship from said memory cartridge and comparing the retrieved predetermined relationship with the relationship between said selected ones of said first and second elements, and generating a determination of whether the selected elements are correctly related.

7. The educational system of claim 6 wherein each of said plurality of test elements comprises a planar surface with said first and second knowledge elements disposed thereon at discrete locations with said first and second patterns visually perceptible.

8. The educational system of claim 7 wherein said means for inputting said first and second patterns into the internal memory of the computer comprises means for inputting the coordinates of the locations of said first and second knowledge elements into the internal memory of the computer and said transducer means for selecting comprises means for inputting the coordinates of one of said first elements into the internal memory of the computer and the coordinates of one of said second elements into the internal memory, the coordinates allowing the computer to distinguish between different locations in said first and second patterns.

9. The educational system of claim 6 and further comprising means for allowing only one selection of any of said first and second knowledge elements such that a comparison can be made between any two of said knowledge elements.

10. The educational system of claim 6 and further comprising pictorial representations on at least one of said test elements, regions of said pictorial representations comprising knowledge elements.

11. The educational system of claim 6 and further comprising means for storing the results of said comparison in said memory cartridge.

12. A method of testing comprising:

generating a plurality of knowledge sets having individual knowledge elements therein, select ones of the knowledge elements in one of the sets related to one of the knowledge elements in another of the knowledge sets;

generating a correlation pattern to define a relationship between all of the knowledge elements;

forming a printed representation of said knowledge sets;

storing the correlation pattern in a portable storage cartridge;

storing in a computer locations of said knowledge elements on said printed representation;

selecting from the printed representation individual ones of the knowledge elements from the knowledge sets and generating representations of the locations thereof for input to the computer; and comparing with the computer the selected knowledge elements from different knowledge sets and determining the correlation therebetween according to the stored correlation pattern in the cartridge.

13. The method of claim 12 further comprising the step of indicating the correlation or non-correlation of sequential knowledge elements with the stored correlation pattern.

14. The method of claim 13 and further comprising storing the correlation results in the cartridge.

15. A testing method utilizing a computer with internal memory, comprising:

arranging a first set of knowledge elements in a first predetermined pattern on a test element;

arranging a second set of knowledge elements in a second predetermined pattern on the test element, each of the second knowledge elements related to one of the first knowledge elements;

storing the first and second patterns in the relationship of the elements in a portable non-volatile memory;

interfacing the portable memory with the computer;

storing representations of the first and second predetermined patterns from the test element in the internal memory of the computer;

selecting from the test element one of the knowledge elements in the first predetermined pattern and one of the knowledge elements in the second predetermined pattern and generating signals to the computer representative of the selected test elements; and comparing the relationship of the two selected elements with the stored relationship in the portable memory to determine if the two selected elements are related.

16. The method of claim 15 wherein the first and second set of knowledge elements are disposed on a planar surface at predetermined locations on the surface thereof.

17. The method of claim 16 wherein the step of storing in the portable memory comprises:

generating a correlation pattern defining the relationship between the elements in the first and second knowledge sets; and storing the correlation pattern in the portable memory.

18. The method of claim 15 further comprising randomizing the relationship between the elements in the first and second knowledge sets prior to arranging thereof on the test element.

19. The method of claim 15 wherein the elements of the first knowledge set are questions and the elements of the second knowledge set are answers to the questions in said first knowledge set.

20. The method of claim 15 and further comprising storing the results of the comparing step in the portable memory such that the correct or incorrect relationship of the selected elements from the first and second knowledge sets can be determined at a later time.

21. An education system for use by a student comprising:

a test element providing a planar surface having a first set of knowledge elements disposed at predetermined locations on the surface thereof and arranged in a first predetermined pattern, and a second set of knowledge elements disposed at predetermined locations on the surface thereof and arranged in a second predetermined pattern, each of said second knowledge elements related to one of said first knowledge elements;

a portable non-volatile memory;

means for storing the correct relationship of the elements in said first and second patterns in said portable memory so as to randomly orient the position of said second set of knowledge elements with respect to said first set of knowledge elements;

a digital computer for interfacing with said portable memory, said computer having on-board memory integral therewith;

means operable by the student for storing said first and second predetermined patterns in said on-board memory of said computer; and means operable by the student for selecting one of the knowledge elements in said first predetermined pattern and one of the knowledge elements in said second predetermined pattern from said test element, the planar surface of said test element being responsive to said means for selecting for generating signals to said computer representative of said selections;

said computer operable for comparing the relationship of the two selected knowledge elements with the stored relationship in said portable memory to determine if the two selected knowledge elements are related.

22. The system of claim 21 wherein each relationship stored in said portable memory is associated with a code, the code being impressed on said planar surface of said test element, wherein the student may operate the computer to retrieve selected relationships from said portable memory.

23. A method of testing comprising:

generating a plurality of knowledge sets having individual knowledge elements therein, select ones of the knowledge elements in one of the sets related to one of the knowledge elements in another of the knowledge sets;

generating a correlation pattern to define a relationship between all of the knowledge elements;

altering the correlation pattern in accordance with a random number sequence;

thereafter forming a printed representation of said knowledge sets;

storing the altered correlation pattern in a portable storage cartridge;

storing in a computer locations of said knowledge elements on said printed representation;

selecting from the printed representation individual ones of the knowledge elements from the knowledge sets and generating representations of the locations thereof to input to the computer; and comparing with the computer the selected knowledge elements from different knowledge sets and determining the correlation therebetween according to the stored altered correlation pattern in the cartridge.

24. Apparatus for correlating data, comprising:

fixed display means for displaying a plurality of first knowledge elements in a first predetermined pattern to form a first knowledge set, said fixed display means also displaying a plurality of second knowledge elements in a second predetermined pattern to form a second knowledge set, at least one of said second elements correlating with each of said first elements;

data processing means for storing said first and second predetermined patterns and the correlation of the elements therein;

a portable memory element for coupling with said data processing means;

means for storing the correlation of said first and second knowledge elements in said portable memory element;

means coupled to said data processing means for generating representations of the location of a selected one of said first knowledge elements and a selected one of said second knowledge elements; and said data processing means operable on said representations for determining if the selected ones of said first and second elements correlate.

25. Apparatus for correlating data, comprising:

fixed display means for displaying a plurality of first knowledge elements in a first predetermined pattern to form a first knowledge set, said fixed display means also displaying a plurality of second knowledge elements in a second predetermined pattern to form a second knowledge set, at least one of said second elements correlating with each of said first elements;

data processing means for storing said first and second predetermined patterns and the correlation of the elements therein;

means coupled to said data processing means for generating representations of the location of a selected one of said first knowledge elements and a selected one of said second knowledge elements;

limiting means for limiting said means for generating to allow selection of any of said first and second elements to only one selection such that association of any of said first and second elements inhibits further associations of those particular elements; and said data processing means operable on said representations for determining if the selected ones of said 26. Apparatus for correlating data, comprising:

fixed display means for displaying a plurality of first knowledge elements in a first predetermined pattern to form a first knowledge set, said fixed display means also displaying a plurality of second knowledge elements in a second predetermined pattern to form a second knowledge set, at least one of said second elements correlating with each of said first elements;

data processing means for storing said first and second predetermined patterns and the correlation of the elements therein;

means coupled to said data processing means for generating representations of the location of a selected one of said first knowledge elements and a selected one of said second knowledge elements;

said data processing means operable on said representations for determining if the selected ones of said first and second elements correlate;

said data processing means storing correlation data for a plurality of different knowledge sets in addition to said first and second knowledge sets; and code sequence means for input into said data processing means for selecting the desired correlation data for the particular knowledge sets being operated upon.

27. A method for correlating knowledge elements, comprising:

generating a plurality of first knowledge elements in a first predetermined pattern to form a first knowledge set;

generating a plurality of second knowledge elements in a second predetermined pattern to form a second knowledge set, each of the second elements corresponding with one of the first elements;

disposing a pattern of first and second points on a surface, the first and second points having a predetermined geometric displacement therebetween;

associating each of the first and second points with their respective coordinates, each of the first points and associated coordinates therewith constituting one of the first knowledge elements and each of the second points and the associated coordinates therewith constituting one of the second knowledge elements;

storing the first and second predetermined patterns with the correlation of the first and second elements thereof in a portable memory cartridge;

interfacing the portable memory cartridge into a computer which determines the correlation of the first and second elements;

selecting from the surface one of the first knowledge elements from a predetermined location in the first stored pattern and generating signals representative thereof;

selecting from the surface one of the second knowledge elements from a predetermined location in the second stored pattern and generating signals representative thereof; and in response to said signals, determining if the selected ones of the first and second elements correlate according to the stored predetermined element correlations.

28. A method for correlating knowledge elements, comprising:

generating a plurality of first knowledge elements in a first predetermined pattern to form a first knowledge set;

generating a plurality of second knowledge elements in a second predetermined pattern to form a second knowledge set, each of the second elements corresponding with one of the first elements;

disposing a pattern of first and second points on a surface, the first and second points having a predetermined geometric displacement therebetween;

associating each of the first and second points with their respective coordinates, each of the first points and associated coordinates therewith constituting one of the first knowledge elements and each of the second points and the associated coordinates therewith constituting one of the second knowledge elements;

storing the correlation of the elements;

selecting from the surface of the first knowledge elements from a predetermined location in the first stored pattern and generating signals representative thereof;

selecting from the surface one of the second knowledge elements from a predetermined location in the second stored pattern and generating signals representative thereof;

limiting selection of the first and second elements to only one selection such that association of any of the first and second elements inhibits further associations of those particular elements; and in response to said signals, determining if the selected ones of the first and second elements correlate according to the stored predetermined element correlations.

* * * * *